United States Patent [19]
Dusza et al.

[11] 3,867,425
[45] Feb. 18, 1975

[54] SUBSTITUTED BENZYL CARBAZIC ACID ESTERS

[75] Inventors: John Paul Dusza, Nanuet; Harry Lee Dindsay; Ralph Grassing Child, both of Pearl River; Seymour Bernstein, New City, all of N.Y.

[73] Assignee: American Cyanamid Company, Stamford, Conn.

[22] Filed: Jan. 9, 1974

[21] Appl. No.: 432,103

[52] U.S. Cl. .............................. 260/471 C, 424/300
[51] Int. Cl. .......................................... C07c 125/06
[58] Field of Search ................................ 260/471 C

[56] References Cited
UNITED STATES PATENTS
3,770,695  11/1973  Nyquist et al.................. 260/471 C

*Primary Examiner*—Lorraine A. Weinberger
*Assistant Examiner*—L. A. Thaxton
*Attorney, Agent, or Firm*—Ernest Y. Miller

[57] ABSTRACT

Compositions and method of treating rhinoviral infections employing substituted benzylidene carbazic acid esters are described.

2 Claims, No Drawings

SUBSTITUTED BENZYL CARBAZIC ACID ESTERS

PRIOR ART

The following prior art is made of record in connection with this application; (1) Rabjohn, N. and Barnstroff, H. D. "Carbazic Acid Esters as Carbonyl Reagents," (2) Journal of the American Chemical Society, 75, 2259-2261 (1953) and references cited therein, (3) Chemical Abstracts, Vol. 59, p. 2715 (1963), (4) Abstracts — Imperial Chemical Industries, Ltd. France Pat. No. 1,314,362 (Jan. 11, 1963), Related Brit. Appl. Dec. 23, 1958, June 22 and Nov. 11, 1959. These references do not disclose the present compounds as useful in rhinoviral infections.

DESCRIPTION OF THE INVENTION

This invention relates to methods for the prevention and treatment of rhinoviral infections. In particular, this invention consists of methods of inhibition of the growth of the common cold viruses (rhinovirus) with pharmaceutical compositions containing a substituted ethylidene carbazic acid ester and a pharmaceutical carrier.

The substituted benzylidene carbazic acid esters which are useful in the treatment of rhinoviral infections may be described by the following formula:

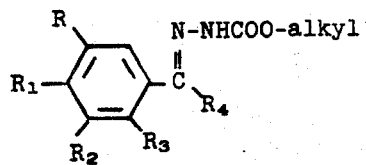

wherein R is hydrogen, phenyl or lower alkoxy ($C_1$-$C_6$), $R_1$ and $R_2$ are each hydrogen, chloride, lower alkyl ($C_1$-$C_6$) or lower alkoxy ($C_1$-$C_6$), $R_3$ is hydrogen or hydroxy, $R_4$ is hydrogen or lower alkyl ($C_1$-$C_6$) and alkyl radical is one consisting of $C_1$ to $C_6$ carbon atoms, with the proviso that when $R_1$ and $R_2$ are both methoxy and R and $R_3$ are both hydrogen, then $R_4$ and alkyl are both ethyl.

The active components of this invention are prepared according to the following method.

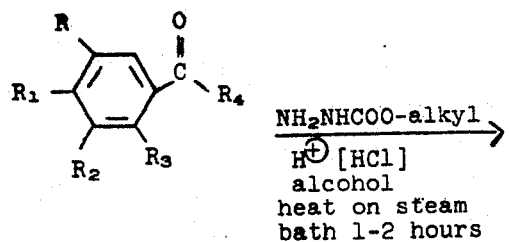

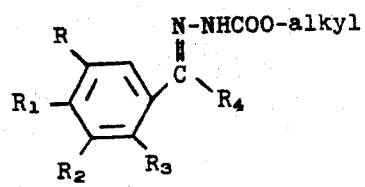

wherein R, $R_1$, $R_2$, $R_3$ and $R_4$ and alkyl are defined as above.

Upon completion of the reaction, the mixture is evaporated under reduced pressure and the residue is treated with water, the resultant precipitate filtered and recrystallized from an appropriate solvent to provide the desired carbazate ester.

Among the specific compounds which can be prepared by the above method are, for example: 3-(p-chlorobenzylidene)-carbazic acid ethyl ester, 3-(3,4,5-trimethoxybenzylidene)-carbazic acid ethyl ester, 3-(p-chloro-α-methylbenzylidene)carbazic acid ethyl ester, 3-(α-ethylveratrylidene)-carbazic acid ethyl ester, 3-(3,4-dichloro-α-methylbenzylidene)-carbazic acid ethyl ester, 3-(3-ethoxysalicylidene)-carbazic acid ethyl ester, 3-(3,4-dichlorobenzylidene)-carbazic acid ethyl ester, 3-(3,4-dichloro-α-ethylbenzylidene)-carbazic acid ethyl ester, 3-(m-α-dimethylbenzylidene)-carbazic acid ethyl ester, 3-(p,α-dimethylbenzylidene)-carbazic acid ethyl ester, 3-(α,3,4-trimethylbenzylidene)-carbazic acid ethyl ester, 3-[1-(3-biphenylyl)ethylidene]-carbazic acid ethyl ester, 3-(3-methoxy-α-methylbenzylidene)-carbazic acid ethyl ester, 3-(3,5-dimethoxy-α-methylbenzylidene)-carbazic acid ethyl ester, 3-(3-ethoxysalicylidene)-carbazic acid methyl ester, 3-[1-(3-biphenylyl)ethylidene]-carbazic acid prolyl ester and 3-(3-ethoxysalicylidene)-carbazic acid butyl ester.

The active components of this invention may be formulated into compositions for use as antirhinoviral agents by methods well known to the skilled pharmaceutical chemist. When compositions were intended to be administered orally, preferably in the form of a tablet or capsule, they can be prepared in the usual manner or formulated into a sustained release preparation by methods well known in the art.

A preferred mode of administration for effecting antirhinoviral activity is by intranasal application, preferably in the form of a suspension or solution which is sprayed into the nasal cavity and having a concentration of from 20 mg. to 300 mg. per cubic centimeter.

A further form of administration can be by intramuscular or subcutaneous injection.

The tablets and capsules are prepared by known methods and may include the usual pharmaceutical excipients such as sucrose, starch, lactose, magnesium stearate, etc. These oral compositions are administered in 2 to 4 doses of 50 mg. to 400 mg. per dose totaling about 100 to 1,600 mg. per day. The intranasal formulation is best administered as a 0.5–10% suspension in the form of a spray or nose drops several times a day. The injectable formulation can be administered once daily at a concentration of 0.5 to 2.0 mg./kg. of body weight.

The compositions are preferably administered to a warm-blooded animal prior to rhinoviral infection in order to prevent or ameliorate the infection, soon after known exposure to infection, or upon recognition of symptoms in order to treat the infection and minimize its systemic effects.

A representative formulation for a tablet containing, for example, the antirhinoviral compound 3-(α-ethylveratrylidene)-carbazic acid ethyl ester is:

| | |
|---|---|
| Active compound | 250 mg. |
| Calcium carbonate | 150 mg. |
| Sucrose | 88 mg. |
| Starch | 20 mg. |
| Magnesium stearate | 5 mg. |

A representative formula for a capsule containing the above antirhinoviral compound is:

| | |
|---|---|
| Active compound | 250 mg. |
| Lactose | 150 mg. |
| Magnesium stearate | 6 mg. |

A representative formulation for an intranasal spray suspension containing the above antirhinoviral compound is:

| | |
|---|---|
| Active compound | 5.0% w/v |
| Sodium carboxymethyl-cellulose | 1.0% w/v |
| Sodium citrate | 0.2% w/v |
| Potassium biphthalate | 0.13% w/v |
| Eucalyptol | 0.02% w/v |
| Trimerosal | 0.001% w/v |
| Purified water qs to | 100% w/v |

The compounds of the present invention exhibit antiviral activity against a variety of rhinoviruses. The following tests were carried out using the active components of this invention. Confluent monolayers of a continuous cell-line such as HeLa, HEp-2, KB or L-132 grown in plastic tissue culture dishes were infected with one of the viruses causing respiratory illness such as the "common cold." These viruses include members of the picornaviruses group including the rhinoviruses, for example, types 1B, 2, 5, 14 or 23 and including the enteroviruses, for example, Coxeackie A-15 or A-21. Protection of the tissues to the cytopathic effects of the viruses was ascertained by means of a plaque inhibition test in which the test compound was adsorbed into a filter paper disc and placed on the agar used to overlay the infected cell monolayers, or by incorporation into the said agar overlay. The agar overlay medium used for this purpose was of the following formulation:

Minimum Essential Medium (Eagles) containing Earle's Salts (Grand Island Biological Company, Grand Island, N. Y.) and to which has been added

| | |
|---|---|
| Ionagar No. 2 | 0.4% |
| Diethylaminoethyl dextran | 0.01% |
| Magnesium chloride | 0.06% |
| Fetal calf serum | 2% (v/v) |

The virus-infected cell monolayers plus test compound were incubated for 3 to 5 days in a humidified atmosphere of 5% carbon dioxide at either 33° or 37°C., depending on the virus. The ability of these compounds to protect tissues from destruction by the viruses was then evident after staining the residual, uninfected, cells with 0.5% crystal violet in 20% ethanol.

A summary of the test results obtained with representative compounds is shown in Table I.

TABLE I

| Compound | Rhinoviruses | | | | |
|---|---|---|---|---|---|
| | 1B | 2 | 5 | 14 | 23 |
| 3-(p-chlorobenzylidene)-carbazic acid ethyl ester | + | + | + | | |
| 3-(3,4,5-trimethoxybenzylidene)-carbazic acid ethyl ester | | + | + | | |
| 3-(p-chloro-α-methylbenzylidene)-carbazic acid ethyl ester | + | + | + | | + |
| 3-(3,4-dichloro-α-methylbenzylidene)-carbazic acid ethyl ester | + | + | | + | |
| 3-ethoxysalicylidene carbazic acid ethyl ester | + | + | + | + | + |
| 3-(3,4-dichlorobenzylidene)-carbazic acid ethyl ester | + | | | | |
| 3-(3,4-dichloro-α-ethylbenzylidene)-carbazic acid ethyl ester | + | + | | | |
| 3-(m,α-dimethylbenzylidene)-carbazic acid ethyl ester | + | + | | | + |
| 3-(p,α-dimethylbenzylidene)-carbazic acid ethyl ester | | | | | |
| 3-(α,3,4-trimethylbenzylidene)-carbazic acid ethyl ester | + | | + | | + |
| 3-[1-(3-biphenylyl)ethylidene]-carbazic acid ethyl ester | + | + | + | + | + |

+ = Protects tissue from destruction by virus.

In addition to the above, the following three compounds were also tested by the above procedure:

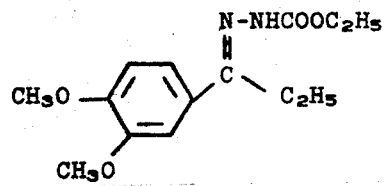

3-(α-ethylveratrylidene)-carbazic acid ethyl ester

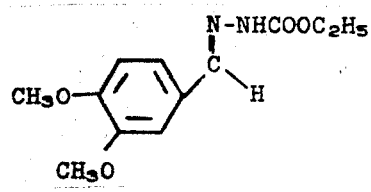

3-(3,4-dimethoxybenzylidene)-carbazic acid ethyl ester

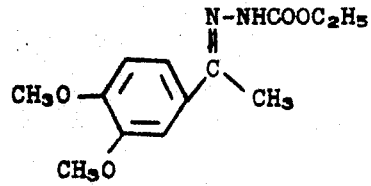

3-(3,4-dimethoxy-α-methylbenzylidene)-carbazic acid ethyl ester

The results are summarized in Table II.

TABLE II

| Compound | Rhinoviruses | | | | |
|---|---|---|---|---|---|
| | 1B | 2 | 5 | 14 | 23 |
| 3-(α-ethylveratrylidene)-carbazic acid ethyl ester | + | + | + | + | + |
| 3-(3,4-dimethoxybenzylidene)-carbazic acid ethyl ester | − | − | − | − | − |
| 3-(3,4-dimethoxy-α-methylbenzylidene)-carbazic acid ethyl ester | − | − | − | − | − |

+ = Protects tissue from destruction by virus.

In addition 3-(α-ethylveratrylidene)-carbazic acid ethyl ester is also active in providing protection against coxsackie A-21 virus.

The results in Table II are separately presented to point out the specificity of antirhinoviral activity as related to chemical structure. It can be seen that 3-(α-ethylveratrylindene)-carbazic acid ethyl ester is an extremely active antirhinviral agent, while the two closely related homologs are inactive.

SPECIFIC DISCLOSURE

The following examples describe the preparation of representative compounds of the invention.

EXAMPLE 1

Preparation of 3-(p-Chlorobenzylidene)-carbazic acid ethyl ester

A mixture of 14.0 gm. of p-chlorobenzaldehyde and 9.7 gm. of ethyl carbazate in ethanol is refluxed for 1.5 hours and then cooled overnight. The product is collected by filtration and recrystallized from ethanol yielding 16.0 gm. of white powder, melting point 147°C. Analysis calculated for $C_{10}H_{11}ClN_2O_2$: C, 52.98; H, 4,89; N, 12,36; Cl, 15.64. Found: C, 53.29; H, 4.83; N, 12.23; Cl, 15.42.

EXAMPLE 2

Preparation of 3-(3,4,5-Trimethoxybenzylidene)-carbazic acid ethyl ester

A mixture of 9.8 gm. of 3,4,5-trimethoxybenzaldehyde, 5.2 gm. of ethyl carbazate and 0.5 ml. of glacial acetic acid in 50 ml of ethanol is refluxed overnight and then cooled. The solid which forms is collected by filtration, washed with ethanol and dried yielding 6.2 gm., melting point 128°–130°C. Analysis calculated for: $C_{13}H_{18}N_2O_5$: C, 55.31; H, 6.43; N, 9.92. Found: C, 55.84; H, 6.50; N, 10.34.

EXAMPLE 3

Preparation of 3-(p-Chloro-α-methylbenzylidene)-carbazic acid ethyl ester

A mixture of 15.46 gm. of 4-chloroacetophenone, 10.4 gm. of ethyl carbazate and 1 drop of concentrated hydrochloric acid in 50 ml. of ethanol is warmed on a steam bath for 15 minutes and then allowed to stand at room temperature overnight. The crystals which form are recovered by filtration, washed with isopropanol and dried yielding 16.6 gm., melting point 140°–141°C.

EXAMPLE 4

Preparation of 3-(α-Ethylveratryl)-carbazic acid, ethyl ester

A mixture of 5.0 gm. of 3,4-dimethoxypropiophenone, 2.71 gm of ethyl carbazate and 2 drops of concentrated hydrochloric acid in 100 ml. of 95% ethanol is refluxed on a steam bath for 1 hour. The mixture is cooled overnight and then evaporated to dryness yielding an oil. This oil is triturated with hot hexane yielding a crystalline product. This product is dissolved in methylene chloride and passed through a column of hydrous acid silicate of magnesium. To the refluxing effluent is added hexane until crystallization. The product is collected by filtration and dried. Analysis calculated for: $C_{14}H_{20}N_2O_4$: C, 59.48; H, 7.19; N, 9.99. Found: C, 59.70; H, 7.52; N, 10.00.

EXAMPLE 5

Preparation of 3-(3,4-Dichloro-α-methylbenzylidene)-carbazic acid, ethyl ester

A mixture of 3.78 gm. of 3,4-dichloroacetophenone, 2.08 gm of ethyl carbazate and 2 drops of concentrated hydrochloric acid in 100 ml of 95% ethanol is refluxed for 1 hour on a steam bath and then evaporated to dryness. The product is recrystallized twice from a mixture of acetone and hexane, yielding 1.63 gm, melting point 132°–133°C. Analysis calculated for: $C_{11}H_{12}Cl_2N_2O_2$: C, 48.02; H, 4.40; N, 10.19; Cl, 25.77. Found: C, 47.69; H, 4.31; N, 10.28; Cl 26.10.

EXAMPLE 6

Preparation of 3-(3-Ethoxysalicylidene)-carbazic acid, ethyl ester

A mixture of 4.98 gm. of 3-ethoxysalicylaldehyde, 3.12 gm. of ethyl carbazate and 2 drops of concentrated hydrochloric acid in 150 ml. of 95% ethanol is heated on a steam bath for 1 hour and then evaporated to dryness. The product is recrystallized twice from acetone-hexane, yielding 5.75 gm., melting point 143°–144°C. Analysis calculated for: $C_{12}H_{16}N_2O_4$: C, 57.13; H, 6.39; N, 11.11. Found: C, 57.25; H, 6.34; N, 10.97.

EXAMPLE 7

Preparation of 3-(3,4-Dichlorobenzylidene)-carbazic acid, ethyl ester

A mixture of 17.5 gm. of 3,4-dichlorobenzaldehyde and 10.4 gm. of ethyl carbazate in 50 ml. of absolute ethanol containing 2 drops of concentrated hydrochloric acid is refluxed for 1 hour and then cooled. The precipitate is filtered and washed with ethanol. Water is added to the filtrate causing reprecipitation of the ethanol soluble product. The two precipitates are combined, dissolved in methylene chloride and passed through a column of acid silicate of magnesium. To the refluxing effluent is added hexane until crystallization. The product is collected, washed with hexane and dried, yielding 9.9 gm., melting point 132°–133.5°C. Analysis calculated for: $C_{10}H_{10}Cl_2N_2O_2$: C, 46.00; H, 3.86; Cl, 27.16; N, 10.73. Found: C, 46.28; H, 3.86; Cl, 27.76; N, 10.84.

EXAMPLE 8

Preparation of 3-(3,4-Dichloro-α-ethylbenzylidene)-carbazic acid, ethyl ester

A mixture of 4.0 gm. of 3,4-dichloropropiophenone and 2.1 gm of ethyl carbazate in 1o ml. of absolute ethanol containing 2 drops of concentrated hydrochloric acid is refluxed for 1.5 hours. The precipitate is collected by filtration, dissolved in methylene chloride and passed through an acid silicate of magnesium column. To the refluxing effluent is added hexane to crystallization. The product is collected by filtration and dried, yielding 4.4 gm., melting point 151°–153.5°C. Analysis calculated for: $C_{12}H_{14}Cl_2N_2O_2$: C, 49.84; H, 4.88; Cl, 24.52; N, 9.69. Found: C, 49.63; H, 4.72; Cl, 24.67; N, 9.66.

EXAMPLE 9

Preparation of 3-(m,α-Dimethylbenzylidene)-carbazic acid, ethyl ester

A mixture of 13.42 gm. of m-methylacetophenone and 10.4 gm. of ethyl carbazate in 50 ml. of absolute ethanol containing 2 drops of concentrated hydrochloric acid is refluxed for 1 hour and then cooled. One half of the ethanol is removed and water is added. The precipitate is collected, dissolved in methylene chloride and passed through an acid silicate of magnesium column. To the refluxing effluent is added hexane to crystallization. The product is collected by filtration and dried, yielding 19.5 gm., melting point 77°–80°C. Analysis calculated for: $C_{12}H_{16}N_2O_2$: C, 65.43; H, 7.32; N, 12.72. Found: C, 65.53; H, 7.28; N, 12.77.

EXAMPLE 10

Preparation of 3-(p,α-Dimethylbenzylidene)-carbazic acid, ethyl ester

A mixture of 13.42 gm. of p-methylacetophenone and 10.4 gm. of ethyl carbazate in 50 ml. of absolute ethanol containing 2 drops of concentrated hydrochloric acid is refluxed for 1 hour and then cooled to room temperature. The precipitate is collected by filtration, washed successively with ethanol and water to give 16.6 g. of the carbazate ester, melting point 108°–111°C. The precipitate is dissolved in methylene chloride and passed through an acid silicate of magnesium column. To the refluxing effluent is added hexane to crystallization. The product is collected by filtration and dried yielding 15.8 gm., melting point 113°–115°C. Analysis calculated for: $C_{12}H_{16}N_2O_2$: C, 65.43; H, 7.32; N, 12.72. Found: C65.83; H, 7.50; N, 12.84.

EXAMPLE 11

Preparation of 3-(α,3,4-Trimethylbenzylidene)-carbazic acid, ethyl ester

A mixture of 24.82 gm. of 3',4'-dimethylacetophenone and 10.4 gm. of ethyl carbazate in 50 ml. of absolute ethanol containing 2 drops of concentrated hydrochloric acid is refluxed for 2 hours and then cooled. The product is collected by filtration, dissolved in methylene chloride and passed through an acid silicate of magnesium column. To the refluxing effluent is added hexane to crystallization. The product is collected by filtration and dried, yielding 19.2 gm., melting point 105°–106.5°C. Analysis calculated for: $C_{13}H_{18}N_2O_2$: C, 66.64; H, 7.74; N, 11.96. Found: C, 66.94; H, 7.86; N, 12.04.

EXAMPLE 12

Preparation of 3-[1-(3-Biphenylyl)ethylidene]-carbazic acid, ethyl ester

A mixture of 2.5 gm. of 3-acetylibphenyl and 2.5 gm. of ethyl carbazate in 10 ml. of absolute ethanol containing 2 drops of concentrated hydrochloric acid is heated on a steam bath for 3 hours. Water is added and gum forms. This gum is dissolved in methylene chloride and passed through an acid silicate of magnesium column. The refluxing effluent is treated with hexane to crystallization. The methylene chloride-acid silicate of magnesium-hexane treatment is repeated. The product is collected, recrystallized from acetone-hexane and dried, yielding 1.30 gm., melting point 107°–107.5°C.

We claim:

1. The compound 3-(α-ethylveratrylidene)-carbazic acid ethyl ester.

2. The compound 3-(3-ethoxysalicylidene)-carbazic acid ethyl ester.

* * * * *